United States Patent
Mitchell et al.

(10) Patent No.: US 9,645,629 B2
(45) Date of Patent: May 9, 2017

(54) PROVIDING ENERGY CONSUMPTION ANALYTICS OF CLOUD BASED SERVICE

(71) Applicant: Microsoft Corporation, Redmond, WA (US)

(72) Inventors: Kent Mitchell, Denver, CO (US); Dan Strader, Seattle, WA (US); Carroll Moon, Alta Vista, VA (US); Hollie McCurdy, Seattle, WA (US); Lou Nikodym, Golden, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 163 days.

(21) Appl. No.: 14/497,053

(22) Filed: Sep. 25, 2014

(65) Prior Publication Data

US 2016/0091948 A1    Mar. 31, 2016

(51) Int. Cl.
  *G06F 1/32*    (2006.01)
  *G06F 11/30*    (2006.01)

(52) U.S. Cl.
  CPC ............. *G06F 1/3206* (2013.01); *G06F 1/32* (2013.01); *G06F 11/3062* (2013.01); *G06F 2201/81* (2013.01)

(58) Field of Classification Search
  CPC ................. G06F 1/32; G06F 1/28; G06F 1/26
  USPC ....... 713/300, 310, 320, 321, 322, 323, 324, 713/330, 340, 375
  See application file for complete search history.

(56) References Cited

U.S. PATENT DOCUMENTS

| | | | |
|---|---|---|---|
| 8,341,441 B2 | 12/2012 | Fletcher | |
| 8,401,833 B2 | 3/2013 | Radibratovic et al. | |
| 8,463,900 B2 | 6/2013 | Dasgupta et al. | |
| 8,677,157 B1* | 3/2014 | Sevtsenko | G06F 11/3457 713/300 |
| 8,713,147 B2 | 4/2014 | Ferris et al. | |
| 8,756,441 B1 | 6/2014 | Mullins et al. | |
| 2003/0176952 A1* | 9/2003 | Collins | H04L 29/06 700/286 |
| 2008/0244281 A1* | 10/2008 | Felter | G06F 1/28 713/300 |

(Continued)

FOREIGN PATENT DOCUMENTS

CN    102830681 A    12/2012

OTHER PUBLICATIONS

Chen, et al., "Automated Analysis of Performance and Energy Consumption for Cloud Applications", In Proceedings of the 5th ACM/SPEC International Conference on Performance Engineering, Mar. 22, 2014, pp. 39-50.

(Continued)

*Primary Examiner* — Mohammed Rehman
*Assistant Examiner* — Keshab Pandey
(74) *Attorney, Agent, or Firm* — Turk IP Law, LLC

(57) ABSTRACT

Energy consumption analytics of a cloud based service is provided. An application such as a power analytics application monitors power consumption data of a server of the cloud based service. The power consumption data of the server is captured in a data file, a data store, a temporary storage, etc. The power consumption data is analyzed to detect power consumption metrics for the server. The power consumption metrics are presented in a business intelligence data structure.

16 Claims, 7 Drawing Sheets

(56) References Cited

U.S. PATENT DOCUMENTS

| | | | |
|---|---|---|---|
| 2009/0231152 A1* | 9/2009 | Tung | G06F 1/206 340/660 |
| 2010/0318827 A1* | 12/2010 | Shah | G06F 1/3203 713/324 |
| 2011/0072293 A1* | 3/2011 | Mazzaferri | G06F 1/3203 713/340 |
| 2011/0235108 A1* | 9/2011 | Kato | G06F 3/1218 358/1.15 |
| 2011/0282982 A1 | 11/2011 | Jain | |
| 2012/0249415 A1* | 10/2012 | Nakajima | G06F 1/1647 345/156 |
| 2013/0042123 A1 | 2/2013 | Smith et al. | |
| 2013/0073882 A1* | 3/2013 | Inbaraj | G06F 1/3206 713/320 |
| 2015/0301572 A1* | 10/2015 | Zhou | G06F 1/3203 713/320 |

OTHER PUBLICATIONS

Buyya, et al., "Energy-Efficient Management of Data Center Resources for Cloud Computing: A Vision, Architectural Elements, and Open Challenges", In Proceedings of the Computing Research Repository, Jun. 2010, 12 pages.

"Intel® Cloud Builders Guide to Cloud Design and Deployment on Intel® Platforms", Published on: Dec. 2011 Available at: http://www.intelcloudbuilders.com/docs/Intel_Cloud_%20Builders_SGI.pdf.

Chheda, et al., "Profiling Energy Usage for Efficient Consumption", The Architecture Journal #18, Jan. 2009, 4 pages.

\* cited by examiner

PROVIDING ENERGY CONSUMPTION ANALYTICS OF CLOUD BASED SERVICE

BACKGROUND

Distributed computing technologies have enabled multiple computing resources to provide coordinated and distinct solutions. An example of distributed computing, cloud computing brings together multiple systems to provide solutions to user needs. Cloud computing can span a vast array of computing resources. The computing resources utilized in cloud computing applications and services are dispersed across networks and locations. Dispersed computing resources are remotely controlled and managed. Usually, manual solutions provide monitoring and analysis support to cloud computing assets. Manual installation solutions by human components of widely dispersed computing resources are not cost effective.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing energy consumption analytics of a cloud based service. In some example embodiments, a power analytics application of the cloud based service may monitor power consumption data of a server of the cloud based service. The power consumption data of the server may be captured during a time period or in real time. The power consumption data may be analyzed to detect power consumption metrics of the server. The power consumption metrics may include total power consumed by the server as well as power consumed by components of the server such as one or more processors, one or more hard disk drives, one or more memory chips, one or more solid state drives, among others. The power consumption metrics may be presented in a business intelligence data structure.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
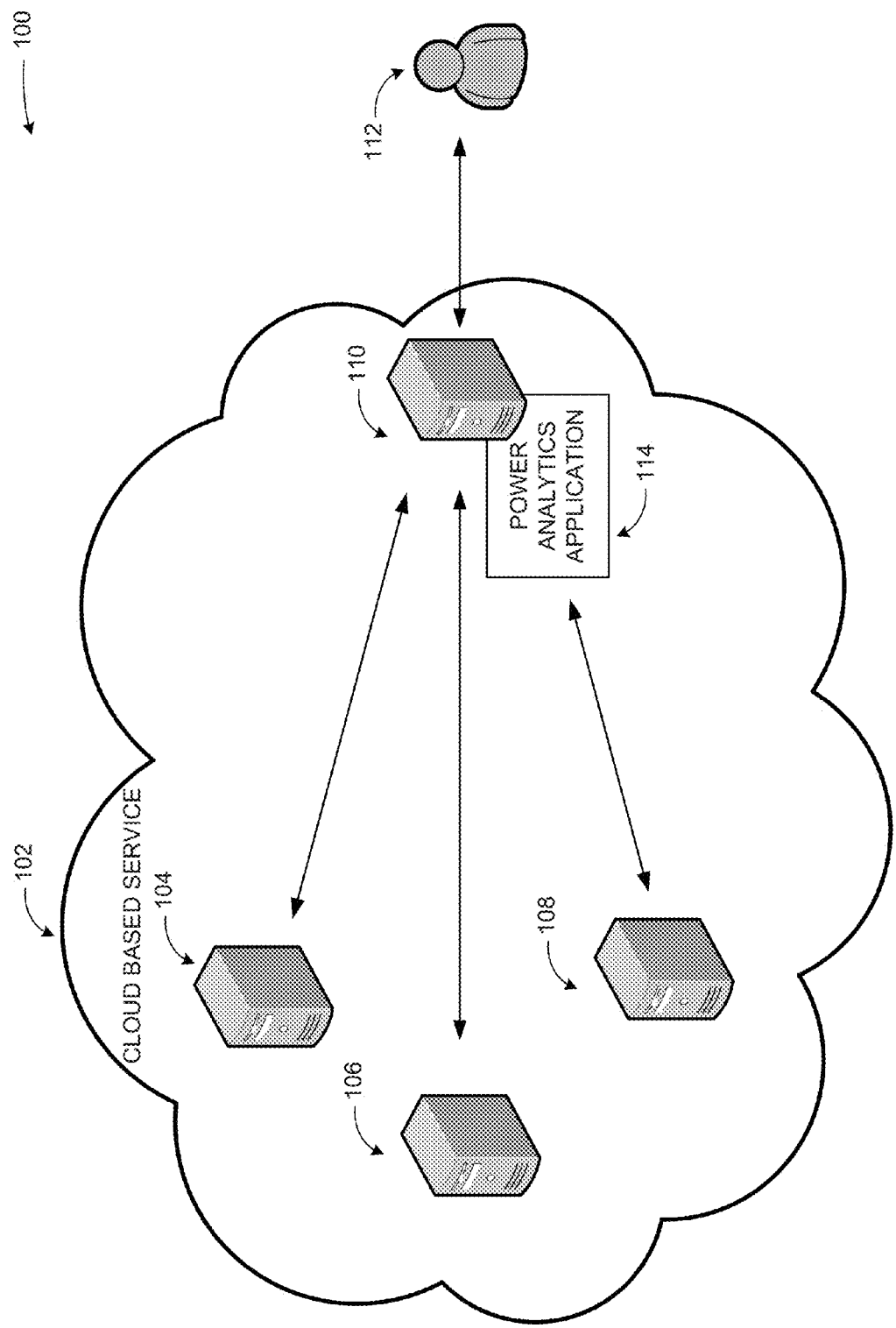
FIG. 1 is a conceptual diagram illustrating an example of providing energy consumption analytics of a cloud based service, according to embodiments.

As briefly described above, energy consumption analytics of a cloud based service may be provided by a power analytics application. Power consumption data of a server of the cloud based service may be monitored and captured. The power consumption data may be analyzed to detect power consumption metrics of the server. The power consumption metrics may be presented in a business intelligence data structure.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide energy consumption analytics of a cloud based service. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example of providing energy consumption analytics of a cloud based service, according to embodiments.

In a diagram 100, a cloud based service 102 may include hardware and application components to provide one or more functions to a consumer 112. The cloud based service 102 may include a data center that provides vast computing resources through multiple computing devices and applications. The consumer 112 may include one or more persons, one or more devices, one or more services, one or more applications, a combination of each, among others. An example of the cloud based service 102 may include document sharing, e-mail services, storage services, among others. The cloud based service 102 may also include a distributed application that provides services through one or more computing devices that execute on one or more application components of the cloud based service 102. The one or more computing devices may be connected through one or more networks that use wired or wireless infrastructure.

Servers (104, 106, and 108) may be hardware components of the cloud based service 102. The servers (104, 106, and 108) may execute one or more applications of the cloud based service 102. The servers (104, 106, and 108) may have hardware components that consume power. Power may be a measure of energy such as voltage used across a time period. The hardware components may include one or more processors, hard disk drives (HDDs), solid state drives (SSDs), memory chips, graphics processing units (GPUs), fans, motherboards, lights, display units, power supply units (PSUs), physical media drives, among others.

Power consumption of the servers (104, 106, and 108) may be monitored and analyzed by a power analytics application 114 that executes on a server 110. Alternatively, the power analytics application 114 may be hosted in a remotely located computing device with privileges to access power consumption data of the servers (104, 106, 108). The power analytics application 114 may compute power consumption metrics of the servers (104, 106, and 108) from the power consumption data. The power consumption metrics may be added to a business intelligence data structure. The business intelligence data structure may include a spreadsheet, a pivot table, a relational data store, an object oriented data store, a cube data structure, big data or map-reduce structure, among others. The business intelligence data structure may include graphs of the power consumption metrics across time periods to present power consumption patterns and trends to one or more stakeholders. Machine learning algorithms may be applied to the business intelligence data structure to discover difficult to detect patterns and interrelations within the data structures. The power consumption metrics may be presented to a stakeholder such as the consumer 112 through the business intelligence data structure, or through distilled output from the machine learning algorithms.

While the example system in FIG. 1 has been described with specific components including the cloud based service 102, the servers (104, 106, 108), the server 110, and the power analytics application 114, embodiments are not limited to these components or system configurations and can be implemented with other system configuration employing fewer or additional components.

Figure 2:
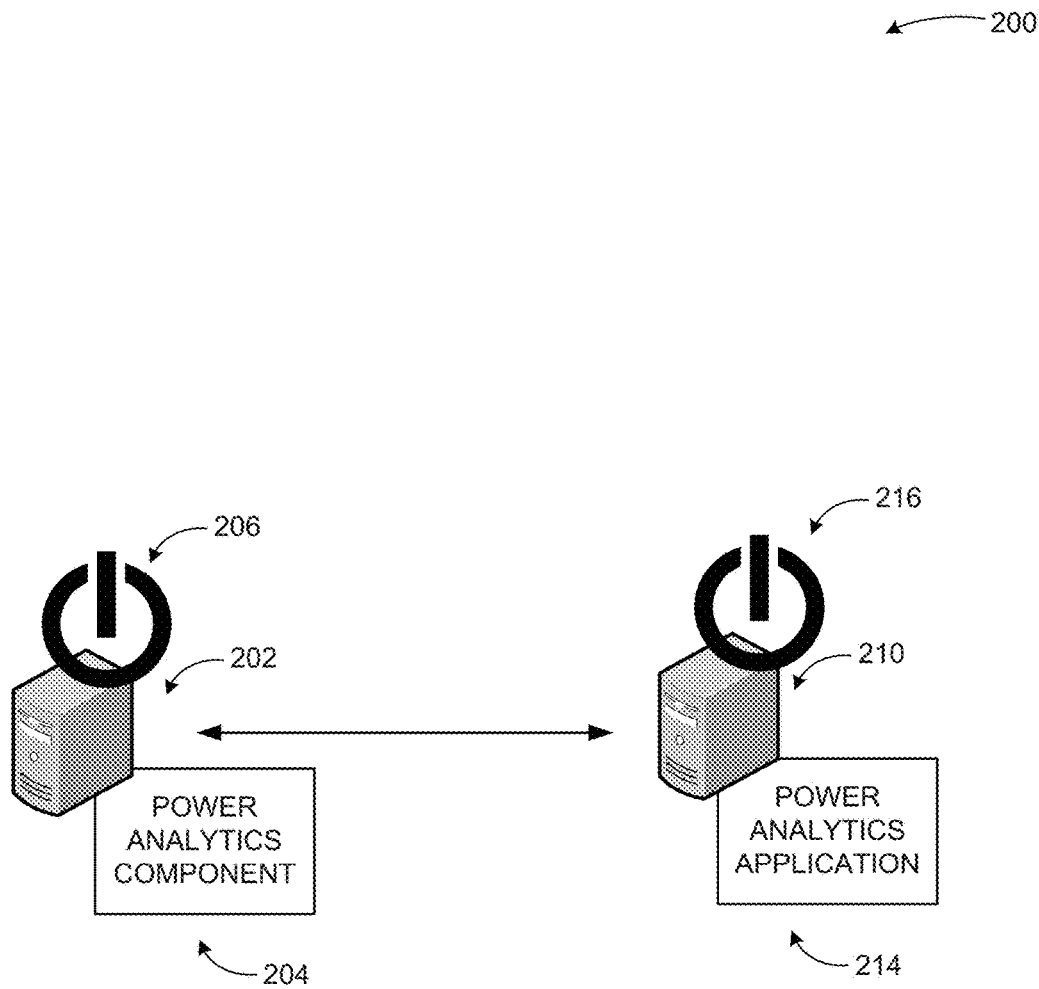
FIG. 2 illustrates components of a scheme to provide power consumption analytics of a cloud based service, according to embodiments.

FIG. 2 illustrates components of a scheme to provide power consumption analytics of a cloud based service, according to embodiments.

In a diagram 200, a scheme to analyze power consumption of a server 202 by a power analytics application 214 may be described. The power analytics application 214 may capture power consumption data 206 from the server 202. A power analytics component 204 of the power analytics application 214 may transmit the power consumption data 206 to the power analytics application 214. The power analytics component 204 may include one or more client detectors that measure power drawn in one or more components of the server 202. The power drawn by the components may be added to compute the power consumption data 206. Alternatively, the power analytics component 204 may measure total power drawn by the server 202 at a power input location of the server 202 such as a voltage regulator. The total power drawn may be transmitted as the power consumption data 206 to the power analytics application 214.

The power analytics application 214 may execute on a computing device 210. The computing device 210 may include a local device of the cloud based service such as another server of the cloud based service. Alternatively, the computing device 210 may include a remote device that is outside of a local network associated with the cloud based service. The remote device may be privileged to access the power consumption data 206 of the server 202. The computing device 210 may analyze the power consumption data 206 to detect power consumption metrics 216 of the server. The power consumption metrics 216 may also include analyzed power consumption data of other servers at the cloud based service. A subset of the other servers may be detected to belong to an operational group or a category associated with the server 202. The power consumption metrics 216 may include analysis of patterns or trends of power consumption of the server 202 compared to peers within the operational group.

Figure 3:
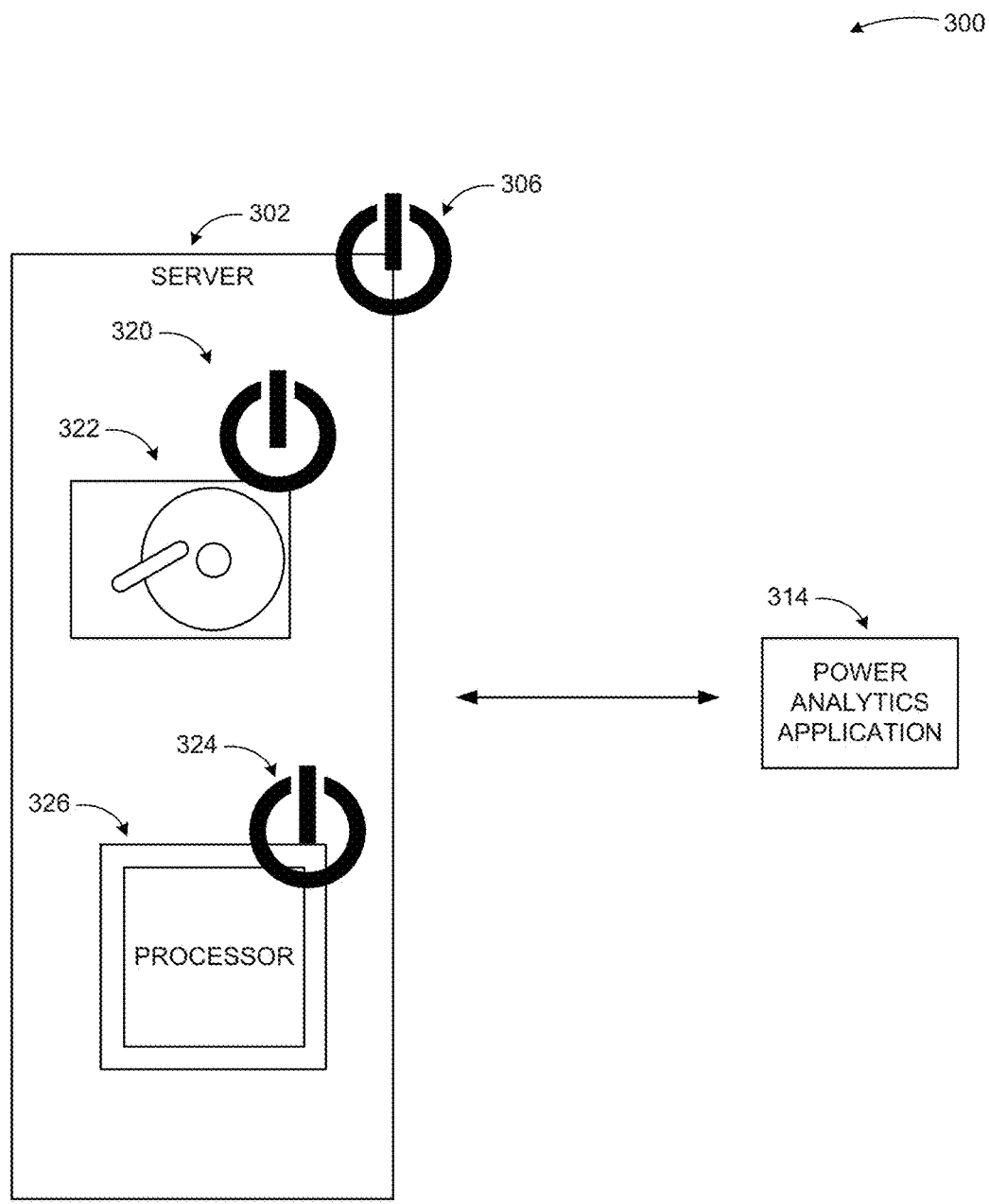
FIG. 3 illustrates a detailed view of components of a cloud based service used to provide power consumption analytics of the cloud based service, according to embodiments.

FIG. 3 illustrates a detailed view of components of a cloud based service used to provide power consumption analytics of the cloud based service, according to embodiments.

In a diagram 300, a power analytics application 314 may analyze energy consumption associated with one or more components of a server 302. A client detector at a server 302 of the power analytics application 314 may transmit power consumption data 306 to the power analytics application. The client detector may measure processor energy consumption 324 of a processor 326 of the server 302. The client detector may also measure an HDD energy consumption 320 of an HDD 322. The processor energy consumption 324 and the HDD energy consumption 320, a total energy consumption of the server 302, among other energy consumption of components of the server may be transmitted to the power analytics application 314 as power consumption data 306.

The power analytics application 314 may analyze the power consumption data 306 to compute trends and patterns associated with the energy consumption of the components of the server 302 as well as total energy consumption by the server 302. A graph may be generated that include the processor energy consumption 324 and power consumption metrics of the server 302 to illustrate a relationship between the processor energy consumption 324 and the power consumption metrics of the server 302. The graph may be included in the business intelligence data structure.

Other graphs that compare, the processor energy consumption 324, the HDD energy consumption 320, the power consumption metrics of the server, processor energy consumption of peers, HDD energy consumption of peers, power consumption metrics of peers, among other component energy consumption may be compared to each other to illustrate trends and patterns in power consumption between the server 302, peers, and components of each. The graphs may be included in the business intelligence data structure. Relationships may be highlighted in the business intelligence data structure. In an example scenario, an increase in the processor energy consumption 324 may lead to an increase in the power consumption metrics of the server 302 which may be associated with an increased load on the server 302. The increase in power consumption of the server 302 may be highlighted by emphasizing peaks in power consumption graphs of the processor 326 and the server 302 associated with load stress on the server 302. Machine learning algorithms may also be applied to the business intelligence data structure to discover difficult to detect patterns and interrelations within the data structures.

Figure 4:
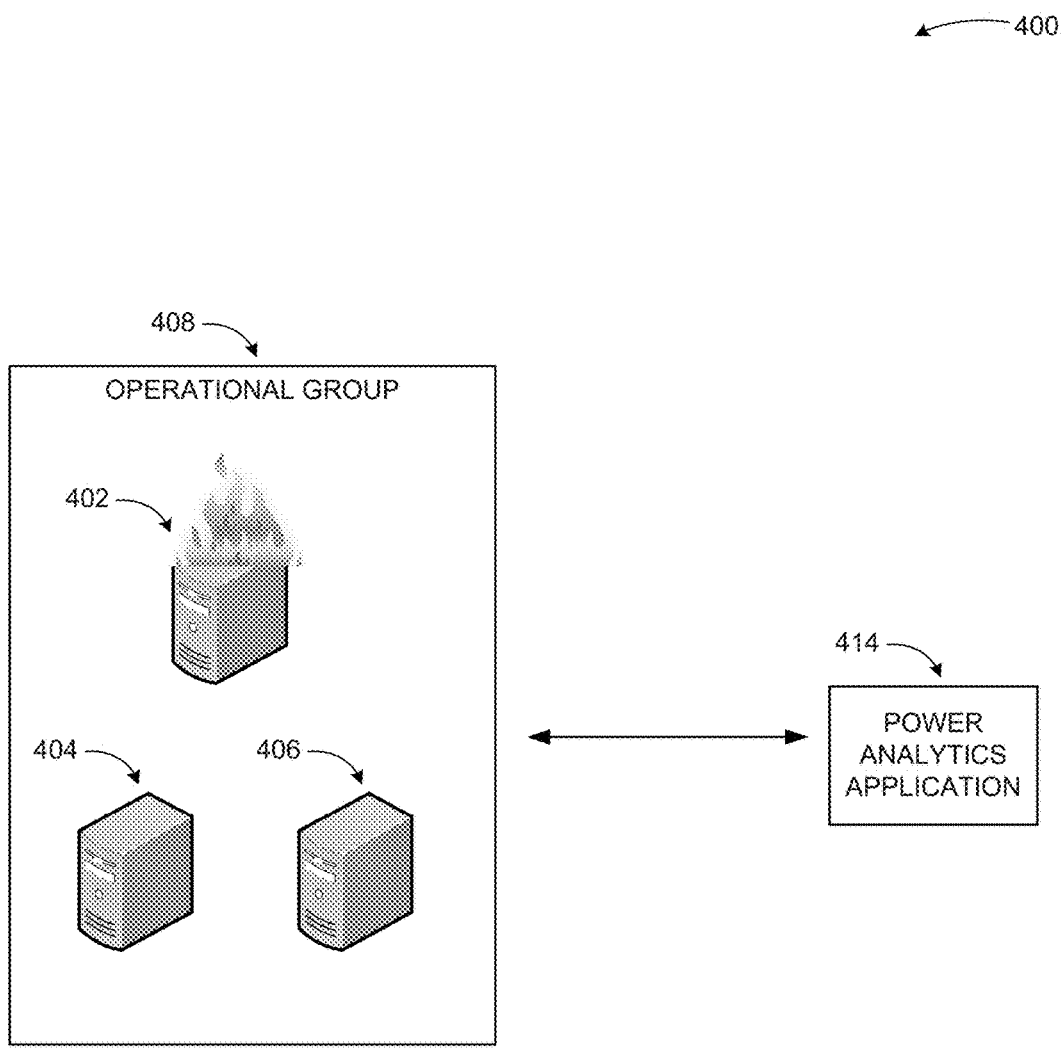
FIG. 4 illustrates an example of providing energy consumption analytics of a cloud based service to detect an outlier component of the cloud based service, according to embodiments.

FIG. 4 illustrates an example of providing energy consumption analytics of a cloud based service to detect an outlier component of the cloud based service, according to embodiments.

In a diagram 400, power consumption data of an operational group 408 may be analyzed by a power analytics application 414. The power analytics application 414 may create the operational group 408 or a category with a server 402 and peers (404 and 406) based on a configuration of the server 402 and the peers (404, and 406) sharing one or more common settings. The common settings may include a common role, a usage pattern based on a business purpose, among others. An example of a common role may include a functionality based role such as processing, data storage, among others. An example of a usage pattern may include an email service distributed across the server 402 and peers (404 and 406), among others.

The power consumption data of the operation group 408 may be analyzed by computing an average power consumption of the operational group 408. The power consumption metrics of the server 402 may be compared to the average power consumption. In response to detecting the power consumption metrics of the server 402 exceeding the average consumption, the server 402 may be labeled as an outlier in the business intelligence data structure. An alert may be generated to inform a stakeholder of the cloud based service that a status of the server 402 may be incorrectly configured or malfunctioning.

The average power consumption of the operational group 408 may also be presented as an optimal power consumption in the business intelligence data structure. Historical data from the power consumption data may be sampled through a time period to compute the average power consumption. Alternatively, real-time stream of the power consumption data of the operational group may be sampled across a time period to compute the average power consumption. Power consumption data of an outlier such as the server 402 may be avoided from the computation the average power consumption to normalize the optimal power consumption. Computations other than the average power consumption may be used to define the optimal power consumption of the operational group 408.

A stakeholder of the cloud based service may be alerted to configure a new asset associated with the operational group 408 to conform to the optimal power consumption. The new asset may include a new server, a new component to be added to a member of the operational group 408, a replacement component to be added to a member of the operational group 408, among others. The stakeholder may also be alerted to configure an application that may execute on the operational group to conform to the optimal power consumption of the operational group 408. An example may include configuring the application to increase or decrease executed operations to stay within the optimal power consumption of the operational group 408 based on available capacity to execute the operations at members of the operational group 408.

The power consumption data of the operational group 408 may also be analyzed to detect an upper threshold for an optimal power consumption by the operational group 408. The upper threshold may include an upper boundary of power consumption which when exceeded may cause members of the operational group 408 to generate failures due to excessive heat production. Alternatively, members of the operational group 408 may generate alerts that describe the members functioning outside a normal process control lower control limit. In response to detecting the power consumption metrics of the server 402 exceeding the upper threshold, an alert may be generated to inform a stakeholder of the cloud based service that a status of the server 402 may be overused, incorrectly configured, or malfunctioning.

The power consumption data of the operation group 408 may also be analyzed to detect a lower threshold for an optimal power consumption by the operational group 408. The lower threshold may include a lower boundary of power consumption which when fallen below may indicate underutilization of members of the operational group 408, as such wasted energy in maintaining the members operational. Alternatively, members of the operational group 408 may generate alerts that describe the members functioning outside a normal process control lower control limit. In response to detecting the power consumption metrics of the server 402 to fall below the lower threshold, an alert may be generated to inform a stakeholder of the cloud based service that a status of the server 402 may be underused, incorrectly configured, and malfunctioning.

The power consumption metrics of the operational group 408 may also be used to suggest that an overused component, that is not malfunctioning, such as the server 402 may be relocated to another location with cheaper utility rates. The power consumption data may be analyzed to detect and predict long term increases or decreases in the power consumption metrics to relocate the server 402. The server 402 may suggested for relocation to a location with cheaper utility rates when detecting and predicting long term increases in power consumption or to a location with higher utility rates with additional space capacity when detecting and predicting long term decreases in power consumption. The utility rates may be compared based on available prices at the locations associated with the cloud based service to determine higher utility rates or lower cheaper utility rates.

The power consumption metrics of the operational group 408 may also be used to optimize an application during development of the application. The power consumption metrics may be compared to application activity metrics of the application during development of the application. The application may be modified based on an analysis of the application activity metrics conformance to the power consumption metrics. An example may include developing the application to limit activity in response to a pattern of high power consumption detected in the power consumption metrics of the operational group 408.

The technical effect of providing energy consumption analytics of a cloud based service may be enhancements and improvements in pattern and trend detection and analysis of power consumption to encompass a distributed system and components of the distributed system compared to individual component based solutions.

The example scenarios and schemas in FIG. 1 through 4 are shown with specific components, data types, and configurations. Embodiments are not limited to systems according to these example configurations. Providing energy consumption analytics of a cloud based service may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
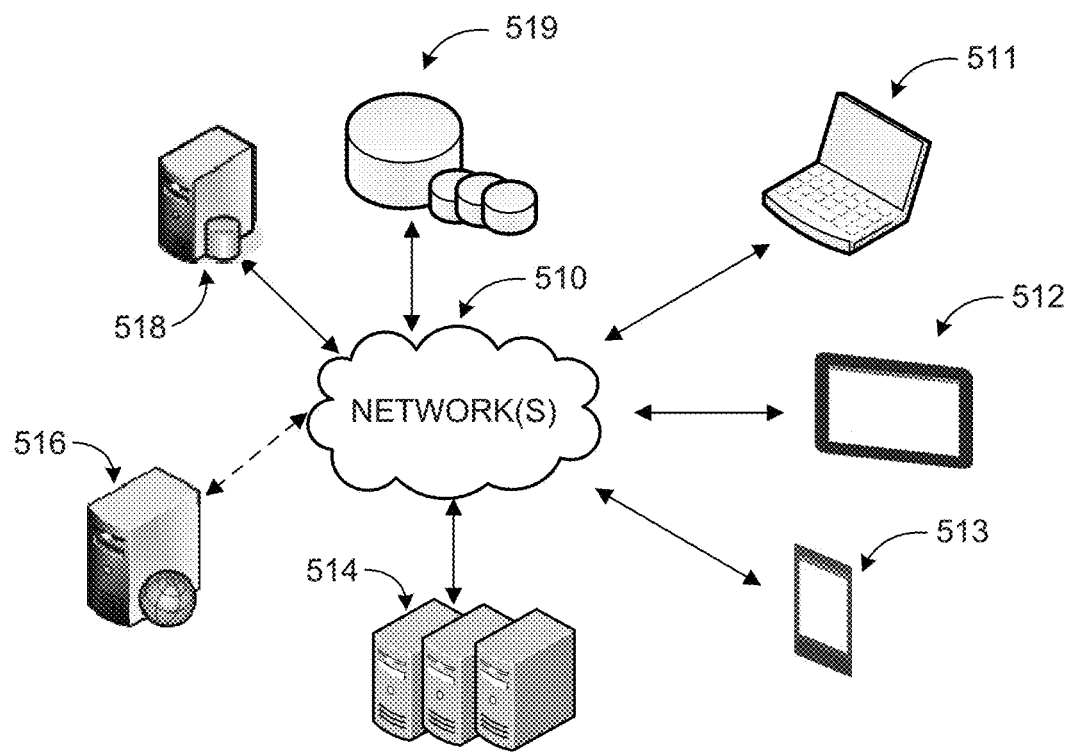
FIG. 5 is a simplified networked environment, where a system according to embodiments may be implemented.

FIG. 5 is an example networked environment, where embodiments may be implemented. A power analytics application configured to provide energy consumption analytics of a cloud based service may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A power analytics application may monitor and capture power consumption data of components of a cloud based service such as a server. The power consumption data may analyzed to detect power consumption metrics of the components and presented in a business intelligence data structure. The power analytics application may store data associated with the power consumption metrics in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide energy consumption analytics of a cloud based service. Furthermore, the networked environments discussed in FIG. 5 are for illustration purposes only. Embodiments are not limited to the example applications, modules, or processes.

Figure 6:
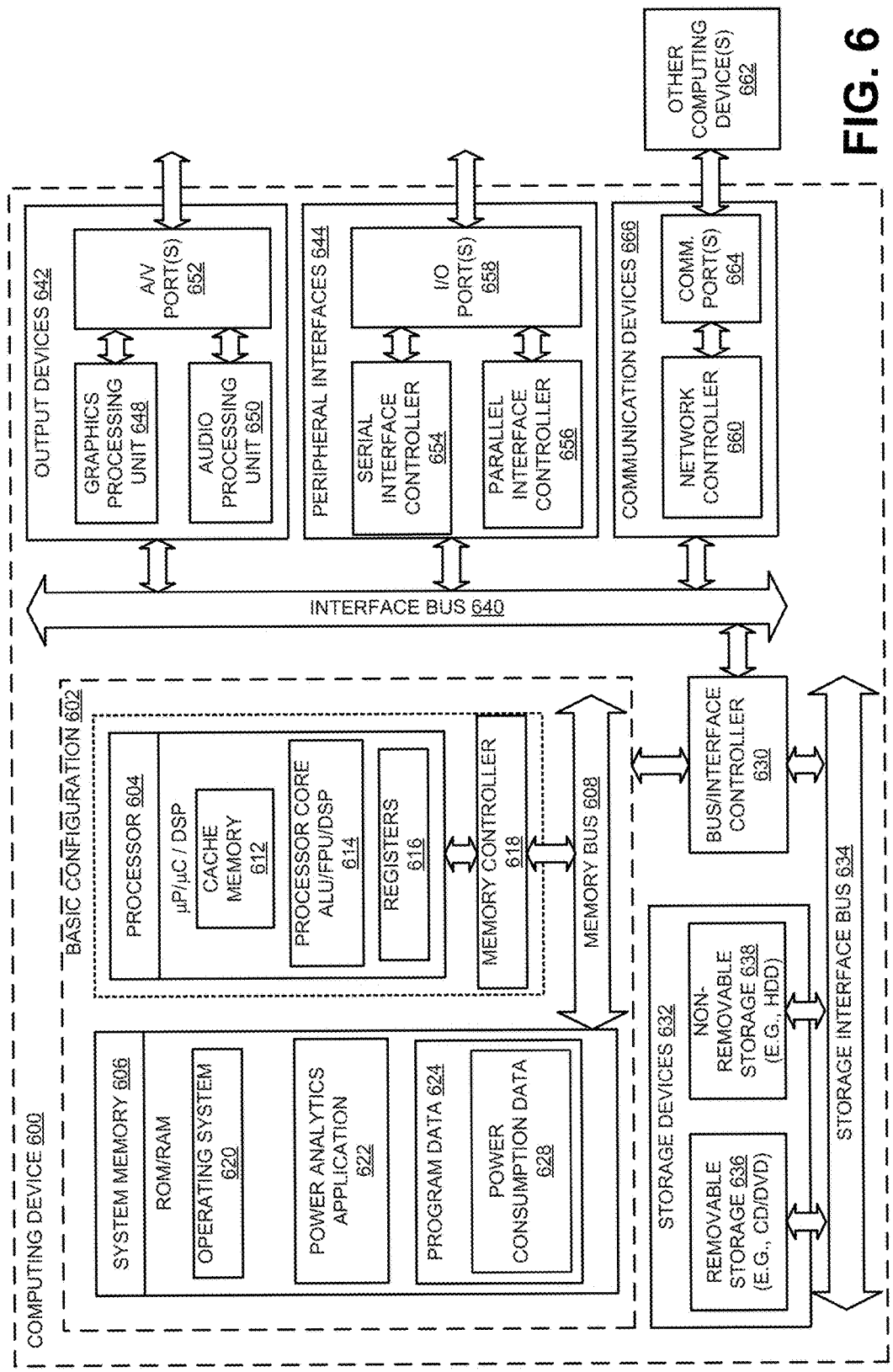
FIG. 6 illustrates a general purpose computing device, which may be configured to provide energy consumption analytics of a cloud based service.

FIG. 6 illustrates a general purpose computing device, which may be configured to provide energy consumption analytics of a cloud based service, arranged in accordance with at least some embodiments described herein.

For example, the computing device 600 may be used to provide energy consumption analytics of a cloud based service. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (µP), a microcontroller (µC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604. The processor 604 may include an analytics processor. The analytics processor may include hardware components optimized to execute instructions of the power analytics application 622. The hardware components may execute the instructions an order of magnitude faster compared to a general purpose processor.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, the power analytics application 622, and a program data 624. The power analytics application 622 may provide energy consumption analytics of a cloud based service. Power consumption data of components of the cloud based service may be monitored and captured. The power consumption data may be analyzed to detect power consumption metrics of the components. The power consumption metrics may be presented in a business intelligence data structure. The program data 624 may include, among other data, a power consumption data 628, or the like, as described herein. The power consumption data 628 may include processor energy consumption, an HDD energy consumption, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include providing energy consumption analytics of a cloud based service. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
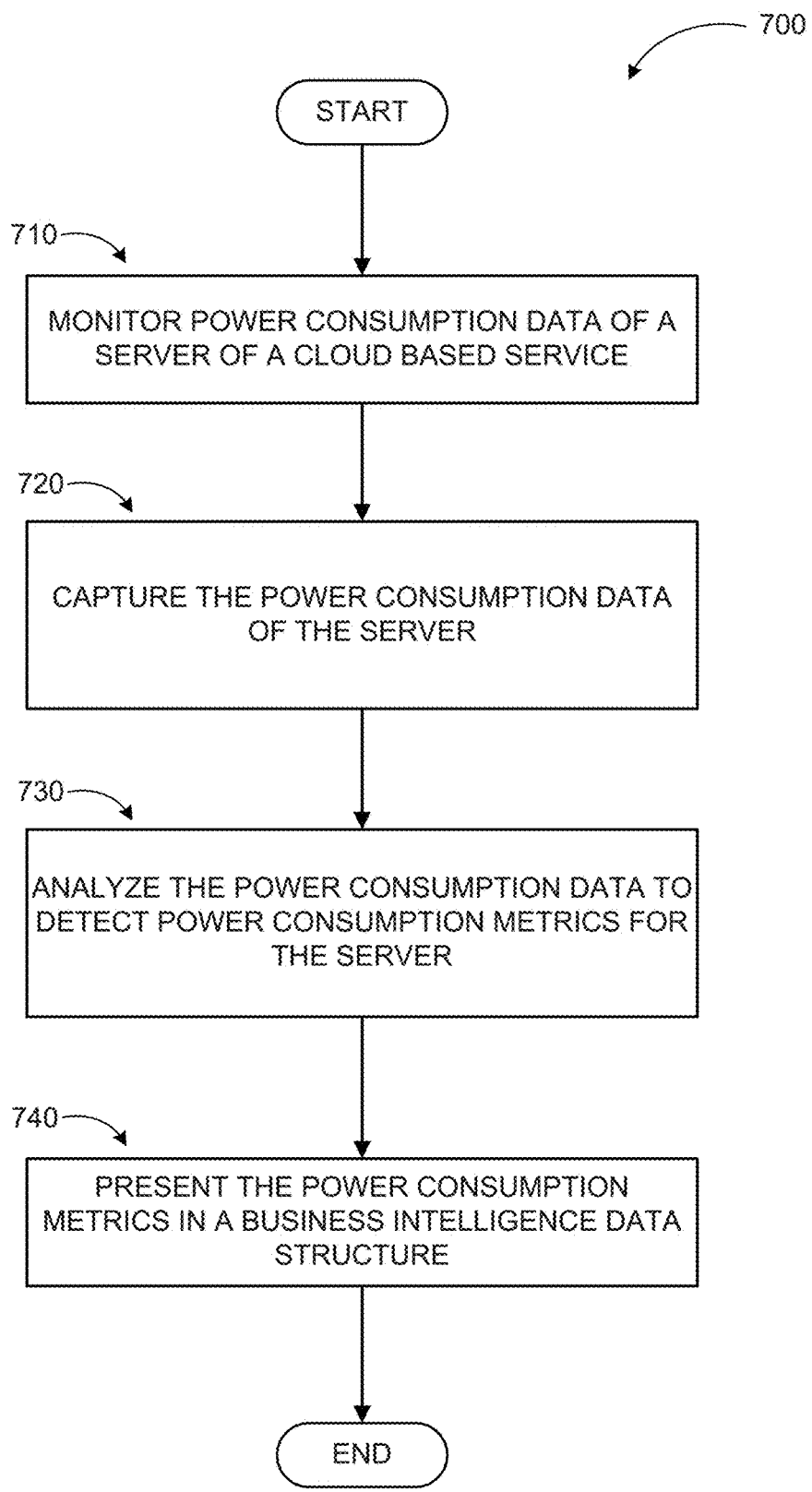
FIG. 7 illustrates a logic flow diagram for a process to provide energy consumption analytics of a cloud based service, according to embodiments.

FIG. 7 illustrates a logic flow diagram for a process to provide energy consumption analytics of a cloud based service, according to embodiments. Process 700 may be implemented on a power analytics application of the cloud based service.

Process 700 begins with operation 710, where a power consumption data of a server of a cloud based service may be monitored. The power consumption data may be monitored upon receiving the power consumption data from one or more power client detectors at components of the cloud based service. At operation 720, the power consumption data of the server may be captured in a data file, a data store, temporary storage, among others. The power consumption data may be analyzed to detect power consumption metrics for the server at operation 730. At operation 740, the power consumption metrics may be presented in a business intelligence data structure.

The operations included in process 700 are for illustration purposes. A power analytics application according to embodiments may be implemented by similar processes with fewer or additional steps, as well as in different order of operations using the principles described herein.

According to some examples, a method that is executed on a computing device to provide energy consumption analytics of a cloud based service may be described. The method may include monitoring power consumption data of a server of the cloud based service, capturing the power consumption data of the server, analyzing the power consumption data to detect power consumption metrics of the server, and presenting the power consumption metrics in a business intelligence data structure.

According to other examples, the method may further include creating an operational group with the server and one or more peers based on a configuration of the server and the one or more peers sharing one or more common settings. The operational group may be created based on the one or more common settings that include a common role and a usage pattern based on a business purpose. The power consumption data of the one or more peers may be captured and analyzed to detect power consumption metrics for the one or more peers and the power consumption metrics of the one or more peers may be presented with the power consumption metrics of the server in the business intelligence data structure. An average power consumption of the operational group may be computed and the power consumption metrics of the server may be compared to the average power consumption.

According to further examples, the method may further include detecting the power consumption metrics of the server to exceed the average power consumption, labeling the server as an outlier in the business intelligence data structure, and generating an alert to inform a stakeholder of the cloud based service that a status of the server is one or more from a set of: incorrectly configured and malfunctioning. The method may further include presenting the average power consumption as an optimal power consumption of the operational group in the business intelligence data structure and alerting a stakeholder of the cloud based service to configure a new asset associated with the operational group to conform to the optimal power consumption, where the new asset includes one or more from a set of: a new server, a new component to be added to a member of the operational group, and a replacement component to be added to another member of the operational group.

According to further examples, the method may further include analyzing the power consumption data of the operational group to detect an upper threshold for an optimal power consumption by the operational group, detecting the power consumption metrics of the server to exceed the upper threshold, and generating an alert to inform a stakeholder of the cloud based service that a status of the server is one or more from a set of: overused, incorrectly configured, and malfunctioning. The method may further include analyzing the power consumption data of the operational group to detect a lower threshold for an optimal power consumption by the operational group, detecting the power consumption metrics of the server to fall below the lower threshold, and generating an alert to inform a stakeholder of the cloud based service that a status of the server is one or more from a set of: underused, incorrectly configured, and malfunctioning.

According to some examples, a computing device to provide energy consumption analytics of a cloud based service may be described. The computing device may include a memory, a processor coupled to the memory. The processor may be configured to execute a power analytics application in conjunction with instructions stored in the memory. The power analytics application may be configured to create an operational group with a server of the cloud based service and one or more peers based on a configuration of the server and the one or more peers sharing one or more common settings, monitor power consumption data of the server and the one or more peers, capture the power consumption data of the server and the one or more peers, analyze the power consumption data to detect power consumption metrics for the operational group, and present the power consumption metrics in a business intelligence data structure.

According to other examples, the power analytics application is further configured to analyze processor energy consumption associated with one or more processors of members of the operational group from the power consumption data. A graph of the processor energy consumption of the server and the power consumption metrics of the server may be generated to show a relationship between the processor energy consumption of the server and the power consumption metrics of the server and the graph may be added to the business intelligence data structure. A graph of the processor energy consumption of the server, the power consumption metrics of the server, the processor energy consumption of the one or more peers, and the power consumption metrics of the one or more peers may be generated to illustrate a comparison relationship between the server and the one or more peers and the graph may be added to the business intelligence data structure.

According to further examples, the power analytics application may be further configured to analyze a hard disk drive (HDD) energy consumption associated with one or more hard disks of members of the operational group from the power consumption data, generate a graph of the HDD energy consumption of the server, the power consumption metrics of the server, the hard disk energy consumption of the one or more peers, and the power consumption metrics of the one or more peers to illustrate a comparison relationship between the server and the one or more peers, and add the graph to the business intelligence data structure.

According to some examples, a computer-readable memory device with instructions stored thereon to provide energy consumption analytics of a cloud based service may be described. The instructions may include actions that are similar to the method described above. The instructions may also include receiving the power consumption data from one or more client detectors measuring power drawn in one or more components of the server and the one or more peers.

According to some examples, a method that is executed on a computing device to provide energy consumption analytics of a cloud based service may be described. The method may include a means for monitoring power consumption data of a server of the cloud based service, a means for capturing the power consumption data of the server, a means for analyzing the power consumption data to detect power consumption metrics of the server, and a means for presenting the power consumption metrics in a business intelligence data structure.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide energy consumption analytics of a cloud based service, the method comprising:
   monitoring power consumption data of servers in an operational group of servers of the cloud based service, wherein the operational group of servers share a common functionality based role and a common usage pattern, wherein the common functionality based role includes one or more of processing and data storage management, and the common usage pattern includes a service executed by the operational group of servers;
   capturing the power consumption data;
   analyzing the power consumption data to detect:
      power consumption metrics of the servers in the operational group, wherein the power consumption metrics includes a total consumed power by the servers in the operational group and by individual subcomponents of the servers in the operational group,
      an upper threshold for an optimal power consumption of the operational group, and
      a lower threshold for the optimal power consumption of the operational group;
   presenting the power consumption metrics in a business intelligence data structure;
   and
   allowing a stakeholder to
      configure a new asset to be added to the operational group to conform to the optimal power consumption of the operational group, wherein the new asset includes one of a server and a server component, and
      configure an application that executes on one or more of the servers in the operational group to increase or decrease operational activities to stay within the optimal power consumption of the operational group.

2. The method of claim 1, wherein
   the operational group is created based on a configuration of the servers in the operational group and one or more peers.

3. The method of claim 2, further comprising:
   capturing and analyzing the power consumption data of the one or more peers to detect power consumption metrics for the one or more peers; and presenting the power consumption metrics of the one or more peers with the power consumption metrics of the servers in the operational group in the business intelligence data structure.

4. The method of claim 2, further comprising:
computing an average power consumption of the operational group; and
comparing the power consumption metrics of the servers in the operational group to the average power consumption.

5. The method of claim 4, further comprising:
detecting the power consumption metrics of the servers in the operational group to exceed the average power consumption;
labeling the servers in the operational group as an outlier in the business intelligence data structure; and
generating an alert to inform a stakeholder of the cloud based service that a status of the servers in the operational group is one or more from a set of: incorrectly configured and malfunctioning.

6. The method of claim 1, further comprising:
detecting the power consumption metrics of the servers in the operational group to exceed the upper threshold; and
generating an alert to inform a stakeholder of the cloud based service that a status of the servers in the operational group is one or more from a set of: overused, incorrectly configured, and malfunctioning.

7. The method of claim 1, further comprising:
detecting the power consumption metrics of the servers in the operational group to fall below the lower threshold; and
generating an alert to inform a stakeholder of the cloud based service that a status of the servers in the operational group is one or more from a set of: underused, incorrectly configured, and malfunctioning.

8. A computing device to provide energy consumption analytics of a cloud based service, the computing device comprising:
a memory;
a processor coupled to the memory, the processor executing a power analytics application in conjunction with instructions stored in the memory, wherein the power analytics application is configured to:
monitor power consumption data of an operational group of servers of the cloud based service and one or more peers based on configuration of the servers in the operational group and the one or more peers, wherein the operational group of servers and the one or more peers share a common functionality based role and a common usage pattern, wherein the common functionality based role includes one or more of processing and data storage management, and the common usage pattern includes a service executed by the operational group of servers;
capture the power consumption data;
analyze the power consumption data to detect:
power consumption metrics for the operational group, wherein the power consumption metrics includes a total consumed power by the operational group and by individual sub-components of servers in the operational group within the operational group,
an upper threshold for an optimal power consumption of the operational group, and
a lower threshold for the optimal power consumption of the operational group; and
present the power consumption metrics in a business intelligence data structure; and
allow a stakeholder to
configure a new asset to be added to the operational group to conform to the optimal power consumption of the operational group, and
configure an application that executes on one or more of the servers in the operational group and the one or more peers to increase or decrease operational activities to stay within the optimal power consumption of the operational group.

9. The computing device of claim 8, wherein the power analytics application is further configured to:
analyze processor energy consumption associated with one or more processors of members of the operational group from the power consumption data.

10. The computing device of claim 9, wherein the power analytics application is further configured to:
generate a graph of the processor energy consumption of the servers in the operational group and the power consumption metrics of the servers in the operational group to show a relationship between the processor energy consumption and the power consumption metrics; and
add the graph to the business intelligence data structure.

11. The computing device of claim 9, wherein the power analytics application is further configured to:
generate a graph of the processor energy consumption of the servers in the operational group, the power consumption metrics of the servers in the operational group, the processor energy consumption of the one or more peers, and the power consumption metrics of the one or more peers to illustrate a comparison relationship between the server and the one or more peers; and
add the graph to the business intelligence data structure.

12. The computing device of claim 8, wherein the power analytics application is further configured to:
analyze a hard disk drive (HDD) energy consumption associated with one or more hard disks of members of the operational group from the power consumption data.

13. The computing device of claim 12, wherein the power analytics application is further configured to:
generate a graph of the HDD energy consumption of the servers in the operational group, the power consumption metrics of the servers in the operational group, the HDD energy consumption of the one or more peers, and the power consumption metrics of the one or more peers to illustrate a comparison relationship between the servers in the operational group and the one or more peers; and
add the graph to the business intelligence data structure.

14. A method to provide energy consumption analytics of a cloud based service, the method comprising:
monitoring power consumption data of an operational group of servers of the cloud based service and one or more peers based on configuration of the servers in the operational group and the one or more peers, wherein the operational group of servers share a common functionality based role and a common usage pattern, wherein the common functionality based role includes one or more of processing and data storage management, and the common usage pattern includes a service executed by the operational group of servers;
capturing the power consumption data;
analyzing the power consumption data to detect:

power consumption metrics of the servers in the operational group,
wherein the power consumption metrics includes a total consumed power by the operational group and by individual sub-components of servers in the operational group within the operational group,
an upper threshold for an optimal power consumption of the operational group, and
a lower threshold for the optimal power consumption of the operational group; and
presenting the power consumption metrics to the in a business intelligence data structure; and
allowing a stakeholder to
configure a new asset to be added to the operational group to conform to the optimal power consumption of the operational group, and
configure an application that executes on one or more of the servers in the operational group and the one or more peers to increase or decrease operational activities to stay within the optimal power consumption of the operational group.

15. The method of claim 14, further comprising:
receiving the power consumption data from one or more client detectors measuring power drawn in one or more components of the servers in the operational group and the one or more peers.

16. The method of claim 14, further comprising:
analyzing processor energy consumption associated with one or more processors of members of the operational group from the power consumption data;
generating a graph of the processor energy consumption of the servers in the operational group, the power consumption metrics of the servers in the operational group, the processor energy consumption of the one or more peers, and the power consumption metrics of the one or more metrics to illustrate a comparison relationship between the servers in the operational group and the one or more peers; and
adding the graph to the business intelligence data structure.

\* \* \* \* \*